US009974051B2

(12) United States Patent
Sorrentino et al.

(10) Patent No.: US 9,974,051 B2
(45) Date of Patent: May 15, 2018

(54) METHOD AND WIRELESS DEVICE FOR PROVIDING DEVICE-TO-DEVICE COMMUNICATION

(71) Applicant: Telefonaktiebolaget LM Ericsson (publ), Stockholm (SE)

(72) Inventors: Stefano Sorrentino, Solna (SE); Stefan Parkvall, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1 day.

(21) Appl. No.: 14/364,020

(22) PCT Filed: Apr. 11, 2014

(86) PCT No.: PCT/SE2014/050447
§ 371 (c)(1),
(2) Date: Jun. 9, 2014

(87) PCT Pub. No.: WO2014/168573
PCT Pub. Date: Oct. 16, 2014

(65) Prior Publication Data
US 2015/0111586 A1    Apr. 23, 2015

Related U.S. Application Data

(60) Provisional application No. 61/811,292, filed on Apr. 12, 2013.

(51) Int. Cl.
*H04W 72/00* (2009.01)
*H04W 72/04* (2009.01)
*H04W 76/02* (2009.01)

(52) U.S. Cl.
CPC ......... *H04W 72/04* (2013.01); *H04W 72/042* (2013.01); *H04W 76/023* (2013.01)

(58) Field of Classification Search
None
See application file for complete search history.

(56) References Cited

U.S. PATENT DOCUMENTS

| 6,112,100 A | 8/2000 | Ossoinig et al. |
| 8,391,131 B2 | 3/2013 | Baldemair et al. |

(Continued)

FOREIGN PATENT DOCUMENTS

| CN | 102037752 A | 4/2011 |
| CN | 102265699 A | 11/2011 |

(Continued)

OTHER PUBLICATIONS

3rd Generation Partnership Project, "Technical Specification Group Radio Access Network; Evolved Universal Terrestrial Radio Access Network (E-UTRAN); X2 application protocol (X2AP) (Release 11)", Mar. 2013, pp. 1-144, 3GPP TS 36.423 V11.5.0.

(Continued)

Primary Examiner — Meless Zewdu
Assistant Examiner — Alexander Yi
(74) Attorney, Agent, or Firm — Coats & Bennett, PLLC

(57) ABSTRACT

The present disclosure relates to methods and to a wireless device, 10, 20, for enabling device-to-device communication. In particular the present disclosure relates to a method, performed in a radio node, of assigning resources for direct control signalling. The method comprises receiving, S1, from at least one further radio node, 160, sets of resources for direct control signalling in a respective cell or cluster. The method further comprises assigning, S2, resources for direct control signalling transmission within an area controlled by the radio node based at least on the received sets of resources, and transmitting, S3, to wireless devices controlled by the radio node, a message indicating resources assigned for direct control signalling. The disclosure also (Continued)

relates to the corresponding method in a wireless device and to a radio and to a wireless device implementing the methods, as well as to corresponding computer programs.

27 Claims, 10 Drawing Sheets

(56) References Cited

U.S. PATENT DOCUMENTS

| | | | |
|---|---|---|---|
| 8,744,471 B1* | 6/2014 | Cai | H04W 72/04 370/395.41 |
| 2003/0147362 A1 | 8/2003 | Dick et al. | |
| 2004/0043797 A1 | 3/2004 | Shostak | |
| 2005/0075125 A1 | 4/2005 | Bada et al. | |
| 2006/0120379 A1 | 6/2006 | Beshai | |
| 2006/0120397 A1 | 6/2006 | Kreiner et al. | |
| 2006/0239333 A1 | 10/2006 | Albert et al. | |
| 2007/0005926 A1* | 1/2007 | Kim | G06F 12/0253 711/170 |
| 2007/0153834 A1* | 7/2007 | Qu | H04L 5/0042 370/478 |
| 2008/0101281 A1* | 5/2008 | Harris | H04L 69/04 370/328 |
| 2008/0144493 A1 | 6/2008 | Yeh | |
| 2008/0181127 A1 | 7/2008 | Terry et al. | |
| 2009/0103465 A1 | 4/2009 | Chow et al. | |
| 2009/0103501 A1 | 4/2009 | Farrag et al. | |
| 2009/0285119 A1 | 11/2009 | Horn et al. | |
| 2009/0310561 A1 | 12/2009 | Grob et al. | |
| 2010/0009675 A1* | 1/2010 | Wijting | H04W 72/02 455/426.1 |
| 2010/0165882 A1 | 7/2010 | Palanki et al. | |
| 2010/0317305 A1 | 12/2010 | Sahlin | |
| 2011/0258313 A1 | 10/2011 | Mallik et al. | |
| 2011/0268006 A1 | 11/2011 | Koskela et al. | |
| 2012/0120849 A1* | 5/2012 | Kazmi | H04W 24/02 370/255 |
| 2012/0178485 A1 | 7/2012 | Zeira et al. | |
| 2012/0236977 A1 | 9/2012 | Zou et al. | |
| 2012/0258706 A1 | 10/2012 | Yu et al. | |
| 2012/0258752 A1 | 10/2012 | Liao | |
| 2012/0306693 A1 | 12/2012 | Edge | |
| 2013/0022010 A1 | 1/2013 | Qianxi et al. | |
| 2013/0040673 A1 | 2/2013 | Siomina et al. | |
| 2013/0083675 A1 | 4/2013 | Yamada | |
| 2013/0148566 A1* | 6/2013 | Doppler | H04W 72/005 370/312 |
| 2013/0150051 A1* | 6/2013 | Van Phan | H04W 12/04 455/437 |
| 2013/0157656 A1* | 6/2013 | Gao | H04W 76/023 455/434 |
| 2013/0188473 A1 | 7/2013 | Dinan | |
| 2013/0258752 A1 | 10/2013 | Park | |
| 2014/0022986 A1 | 1/2014 | Wu et al. | |
| 2014/0105192 A1 | 4/2014 | Park et al. | |
| 2014/0162545 A1 | 6/2014 | Edge | |
| 2014/0204898 A1* | 7/2014 | Yang | H04W 8/005 370/330 |
| 2014/0269642 A1 | 9/2014 | Forenza et al. | |
| 2014/0286215 A1* | 9/2014 | Koc | H04W 28/24 370/311 |
| 2015/0181583 A1* | 6/2015 | Siomina | H04W 16/14 370/330 |
| 2015/0215883 A1 | 7/2015 | Zheng et al. | |
| 2015/0289282 A1 | 10/2015 | Phuyal et al. | |
| 2016/0014589 A1* | 1/2016 | Niu | H04W 74/02 370/329 |
| 2016/0028572 A1 | 1/2016 | Suzuki et al. | |

FOREIGN PATENT DOCUMENTS

| | | |
|---|---|---|
| CN | 102972050 A | 3/2013 |
| EP | 2211581 A1 | 7/2010 |
| RU | 2011100785 A | 7/2012 |
| WO | 2011130630 A1 | 10/2011 |
| WO | 2011147462 A1 | 12/2011 |
| WO | 2013005972 A2 | 1/2013 |
| WO | 2013074015 A1 | 5/2013 |
| WO | 2013078901 A1 | 6/2013 |

OTHER PUBLICATIONS

3rd Generation Partnership Project, "Technical Specification Group Services and System Aspects; Feasibility study for Proximity Services (ProSe) (Release 12)", Jun. 2013, pp. 1-45, 3GPP TR 22.803 V12.2.0.

Chen, Tao, et al., "Time Hopping for Device-to-Device Communication in LTE Cellular System." IEEE WCNC 2010 proceedings. 2010. IEEE, Piscataway, NJ.

* cited by examiner

| Beacon A | Beacon B | Beacon C |

Fig. 1

| Beacon A |
| Beacon B |
| Beacon C |

Fig. 2

| Beacon A + Beacon B + Beacon C |

Fig. 3

METHOD AND WIRELESS DEVICE FOR PROVIDING DEVICE-TO-DEVICE COMMUNICATION

PRIORITY

This nonprovisional application is a U.S. National Stage Filing under 35 U.S.C. § 371 of International Patent Application Serial No. PCT/SE2014/050447, filed Apr. 11, 2014 and entitled "A Method and Wireless Device for Providing Device-to-Device Communication."

TECHNICAL FIELD

Embodiments herein relate to wireless communication systems, such as telecommunication systems. In particular, embodiments herein relate to direct communication between wireless devices.

BACKGROUND

Device-to-device communication is a well-known and widely used component of many existing wireless technologies, including ad hoc and cellular networks. Examples include Bluetooth and several variants of the Institute of Electrical and Electronics Engineers (IEEE) 802.11 standards suite such as WiFi Direct. These systems operate in unlicensed spectrum Recently, device-to-device, D2D, communications as an underlay to cellular networks have been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource and (dynamic) sharing between the device-to-device services and cellular services is more flexible and provides higher spectrum efficiency. D2D communication in cellular networks is often defined as direct communication and the mechanisms for controlling such communication as direct control, DC.

Devices that want to communicate directly, or even just discover each other, typically need to transmit various forms of control signalling. One example of such direct control signalling is the so-called beacon signal, which at least carries some form of identity and is transmitted by a device that wants to be discoverable by other devices. Other devices can scan for the beacon signal. Once the devices have detected the beacon, they can take the appropriate action, for example to try to initiate a connection setup with the device transmitting the beacon.

Multiple devices can transmit control signalling (beacon signals as well as other types of control signalling) simultaneously. The transmissions from the different devices may be time synchronized (mutually time-aligned) or unsynchronized. Synchronization could be obtained for example by receiving appropriate signals from the overlaid cellular network, or from a global navigation satellite system such as GPS. An example of asynchronous beacon reception happens when wireless devices in proximity belong to neighbour unsynchronized cells.

FIG. 4 illustrates one example of DC messages reception in an unsynchronized scenario. The receiver needs multiple, possibly overlapping, reception windows and corresponding parallel FFT processes. Direct control signalling may include DC messages, beacons and the like.

To reduce device power consumption, discontinuous reception, DRX, is typically used. With DRX, the device is sleeping most of the time but regularly (occasionally) wakes up to check for transmissions intended for that device.

Multiple unsynchronized transmissions of control signalling results in several problems:

As the possible time instants when (control signalling) transmissions may occur are not known, each device need to wake up frequently to check for transmissions with a corresponding negative impact on power consumption. This is particularly problematic for beacons, which are expected to be transmitted seldom (with a periodicity in the orders of up to seconds) and which might greatly contribute to discovery latency if their reception is missed.

Reception of multiple unsynchronized and partially overlapping transmissions requires multiple FFTs, adding to the device complexity and is associated to strong inter-message interference and near-far problems.

Multiplexing capacity of multiple transmissions is generally lower in absence of time synchronization.

Additionally, the reception of weak messages might be impossible when strong messages are received on partly overlapping resources in time. This is because the automatic gain control, AGC, at the receiver is typically adjusted based on the strongest signals, and it would be largely not optimal for the weak signals.

Multiplexing control signalling from multiple devices can be done in multiple ways, for example using Time Division Multiple Access, TDMA, Frequency division Multiple Access, FDMA, or Code Division Multiple Access, CDMA. The choice and/or details of the multiplexing scheme may depend on whether the devices are time synchronized or not. FIG. 1 illustrates an example of TDMA multiplexing of DC messages within a single Direct Control, DC, resource. FIG. 2 illustrates an example of FDMA multiplexing of DC messages within a single DC resource. FIG. 3 illustrates an example of CDMA multiplexing of DC messages within a single DC resource.

Several different transmission schemes for the control signalling can be thought of. One possibility is OFDM and derivatives thereof, e.g. Discrete Fourier Transform, DFT, -precoded Orthogonal Frequency Division Multiplexing, OFDM, which allows for a low-complex yet effective receiver implementation using a Fast Fourier Transform, FFT.

SUMMARY

It is an object to improve direct control signalling, e.g. increase probability of successful reception of direct control signalling, such as a DC message of the above mentioned kind.

According to one aspect of the present disclosure, it relates to a method, performed in a radio node, of assigning resources for direct control signalling. The method comprises receiving, from at least one further radio node, sets of resources for direct control signalling in a respective cell or cluster, and assigning resources for direct control signalling transmission within an area controlled by the radio node based at least on the received sets of resources. The method further comprises transmitting, to wireless devices controlled by the radio node, a message indicating resources assigned for direct control signalling. The proposed solution enables synchronization of Direct Control, DC, resources whereby multiple DC messages may be received within the same reception window, reducing the need for multiple reception windows and correspondingly improving energy consumption and interference.

Furthermore, when attempting reception of DC messages transmitted from UEs camping on another cell, the probability of receiving multiple DC messages within the same reception window is increased. This reduces receiver implementation complexity because typically a single FFT process is needed for each reception window.

Assuming that UEs belonging to the same cell have relatively similar path loss towards a given UE, it is easier for the receiver to set AGC for each subframe and safely decode the DC messages multiplexed within the subframe.

According to one aspect the message indicates respective resources assigned for direct control signalling in each of a cell or cluster defined by the radio node and at least a further cell or cluster. A wireless device, may need to receive control signalling relating to neighbouring devices irrespective of whether those devices are located in the same network cell as the first device or not. In other words, from a device-to-device communication perspective, there are no cell boundaries.

According to one aspect the step of receiving, comprises negotiating, with at least one other radio node, resources for direct control signalling, thereby increasing an overlap in time and/or frequency of resources for direct control signalling in different cells or clusters. Such a solution makes DTX more efficient.

According to one aspect the step of receiving, comprises negotiating, with at least one other radio node, resources for direct control signalling, thereby decreasing an overlap in time and/or frequency of resources for direct control signalling in different cells or clusters. Such a solution may prevent interfering transmissions.

According to one aspect the assigning comprises to assigning resources for D2D discovery signalling. Hence, wireless devices only needs to listen for discovery messages or beacons at predetermined times.

According to one aspect the message comprises at least one identifier for a cell or cluster defined by the radio node.

According to one aspect the resources are radio resources, resource blocks, sub frames or sub-channels.

According to one aspect the radio node is a wireless device with authority to control one or more other wireless devices in D2D communication and the method further comprises sending, to a wireless device, a second direct control message using the assigned resources.

According to one aspect the step of assigning comprises assigning resources that occur periodically on a per radio frame basis.

According to one aspect the disclosure further relates to a computer program comprising computer program code which, when executed in a radio node, causes the radio node to execute the method described above.

According to one aspect the disclosure further relates to a method, performed in a D2D, Device to Device, device, of obtaining resources for direct control signalling in D2D communication. The method comprises receiving, from a radio node, a message indicating resources assigned for direct control signalling to wireless devices controlled by the radio node, and utilising the indicated resources for direct control signalling.

According to one aspect the message indicates respective resources for direct control signalling in each of a cell or cluster defined by the radio node and a further cell or cluster defined by a further radio node.

According to one aspect the step of utilising further comprises receiving a second message, using the indicated resources.

According to one aspect the step of utilising further comprises transmitting a third message, using the resources provided in the received message.

According to one aspect the second and third messages are separated by Time Division Multiple Access, TDMA, Code Division Multiple Access, CDMA, or Frequency Division Multiple Access, FDMA.

According to one aspect the method further comprises selecting at least one indicated resource for monitoring.

According to one aspect the method further comprises determining discontinuous reception, DRX, cycles of the wireless device using information comprised in the received message.

According to one aspect the disclosure further relates to computer program comprising computer program code which, when executed in a wireless device causes the wireless device to execute the methods as described above.

According to one aspect the disclosure further relates to a radio node, configured to assign resources for direct control signalling. The radio node comprises a transmitter, a receiver and processing circuitry. The processing circuitry is configured to cause radio node to receive, using the receiver, from at least one further radio node, sets of resources for direct control signalling in a respective cell or cluster, assign resources for direct control signalling based on the received sets of resources, and transmit, using the transmitter, to wireless devices controlled by the radio node, a message indicating resources assigned for direct control signalling. The method according to any of the preceding claims, wherein the radio node is a radio network node.

According to one aspect the radio node is a radio network node.

According to one aspect the radio node is a wireless device with authority to control one or more other wireless devices.

According to one aspect the disclosure further relates to a wireless device configured to obtaining resources for direct control signalling. The wireless device comprises a transmitter, a receiver and processing circuitry. The processing circuitry is configured to cause the wireless device to receive, using the receiver, from a radio node, a message indicating resources assigned for direct control signalling to wireless devices controlled by the radio node, and utilise, using the receiver and/or the transmitter, the indicated resources for direct control signalling.

Advantageously, at least some embodiments herein allows the UE to increase the DRX cycle and simplify UE implementation at least for the NW coverage case and for the out of NW coverage case, when a cluster head is available. Inter-beacon interference, as an example of direct control signalling for inter-cell discovery, is also reduced.

An object according to the present embodiments is to alleviate at least some of the problems mentioned above. A further object according to some embodiments is to provide a mechanism for enabling synchronisation in device-to-device communication

BRIEF DESCRIPTION OF THE DRAWINGS

FIG. 1 Example of TDMA multiplexing of DC messages within a single Direct Control (DC) resource.

FIG. 2 Example of FDMA multiplexing of DC messages within a single DC resource.

FIG. 3 Example of CDMA multiplexing of DC messages within a single DC resource.

DETAILED DESCRIPTION

Figure 4:
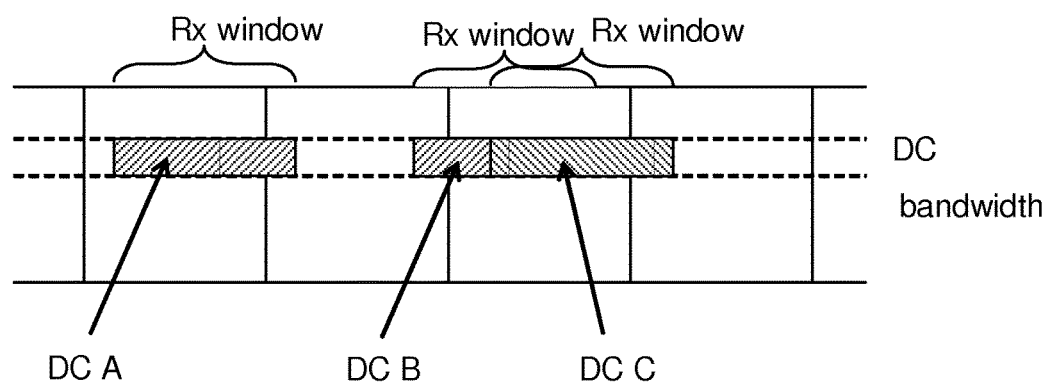
FIG. 4 Example of DC messages reception in an unsynchronized scenario.

The proposed technique is based on the understanding that, a UE, or a wireless device, typically need to receive control signalling from neighbouring devices irrespective of whether those neighbouring devices are located in the same network cell as the UE. In other words, from a device-to-device communication perspective, there are no cell boundaries. It is also of interest to extend D2D to multi-carrier and multi-operator scenarios.

According to an aspect, the object may be achieved by a method in a radio node for allocating resources for direct control signalling in a D2D communication. A corresponding method in a wireless device, such as a second wireless device, for obtaining resources for direct control signalling in a D2D communication is also provided.

This disclosure, proposes a method for allocation of resources for direct control discovery purposes. The method allows efficient UE implementation (fewer parallel FFT processes, simpler AGC). Signalling of multi-cell discovery resources is also proposed according to some embodiments. According to some embodiments herein, multiple DRX cycles are defined in order to efficiently support the network (NW) coverage case and out of coverage case.

Throughout the following description similar reference numerals have been used to denote similar elements, network nodes, parts, items or features, when applicable.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

Figure 5A:
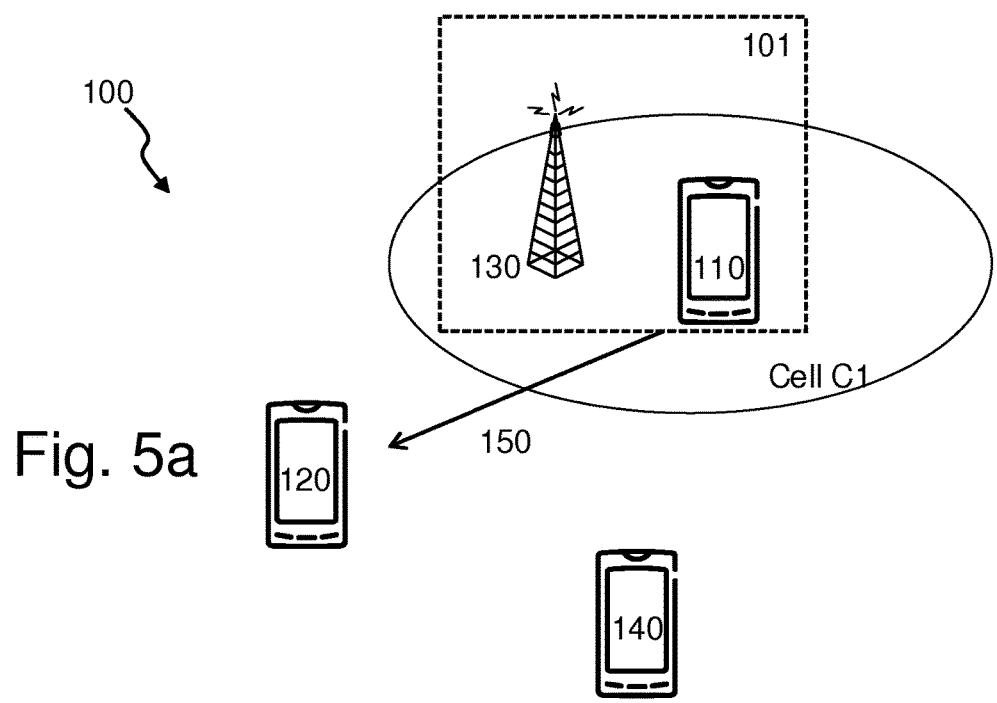
FIG. 5a-5d depict exemplifying radio communications systems 100 in which embodiments herein may be implemented.

FIG. 5a depicts an exemplifying radio communications system 100 in which the proposed technique may be implemented. In this example, the radio communications system 100 is a Long Term Evolution (LTE) system. In other examples, the radio communication system may be any Third Generation Partnership Project (3GPP) cellular communication system, such as a Wideband Code Division Multiple Access (WCDMA) network, a Global System for Mobile communication (GSM network), an evolution of any one of the above mentioned systems or the like.

Figure 9:
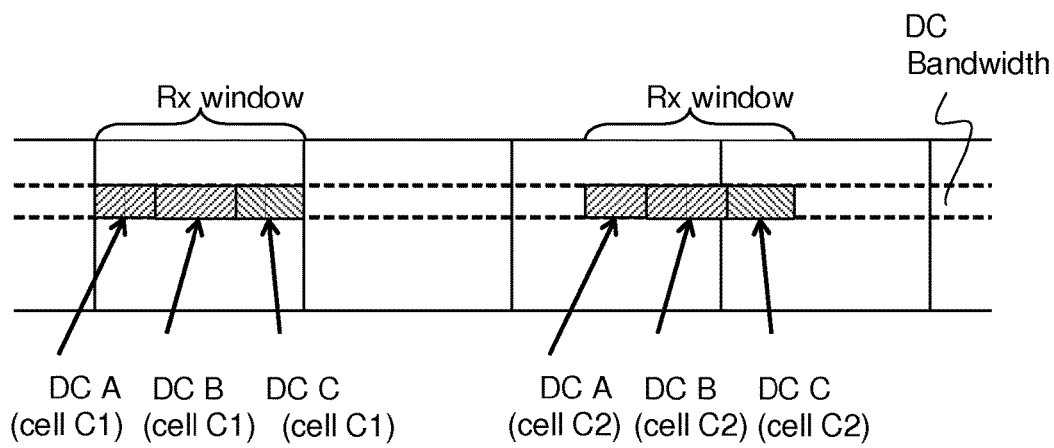
FIG. 9 illustrates a DC bandwidth available for assignment to for example DC messages.

The radio communication system 100 comprises a radio network node 130. As used herein, the term "radio network node" may refer to an evolved Node B, eNB, a control node controlling one or more Remote Radio Units, RRUs, a radio base station, an access point or the like. The radio network node 130 may be configured to operate over a so called system bandwidth. A portion of the system bandwidth may be reserved, statically or dynamically, for D2D communication. Hence, a DC bandwidth, as shown in FIG. 9, is available for assignment to for example DC messages.

The radio network node 130 may operate a cell C1. More generally, the cell C1 may be comprised in the radio communication system 100.

Furthermore, a first wireless device 110 may be located inside the cell C1, e.g. in range for communication with the radio network node 130, as in FIG. 5a. As used herein, the term "wireless device" may refer to a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The wireless device is configured for D2D communication. The sensor may be any kind of weather sensor, such as wind, temperature, air pressure, humidity etc. As further examples, the sensor may be a light sensor, an electronic switch, a microphone, a loudspeaker, a camera sensor etc.

Figure 5B:
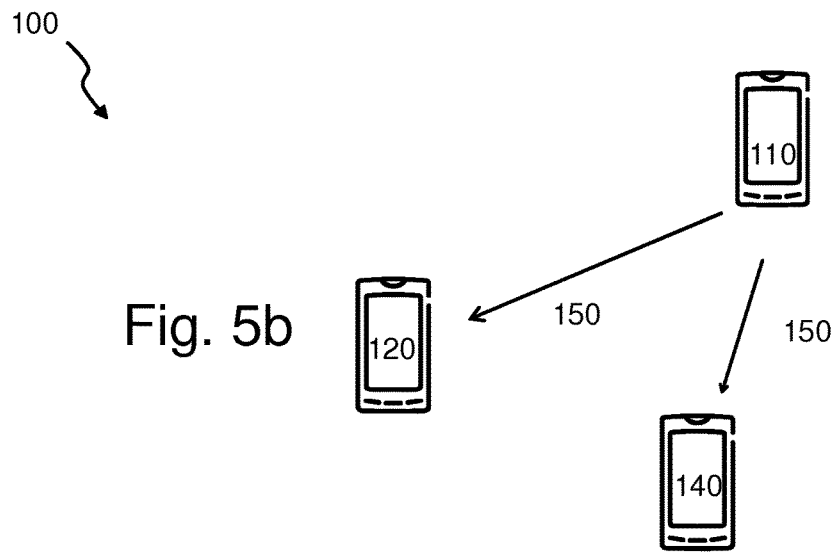

In other examples, the wireless device 110 may be located outside the cell C1, i.e. out of coverage for communication with the radio network node 130, as shown in FIG. 5b. In such a scenario the wireless device 110 provides synchronisation for the device to device communication. From hereby we refer to such devices as being controlled by the wireless device 110. These devices may be referred to as belonging to a cluster.

Figure 5C:
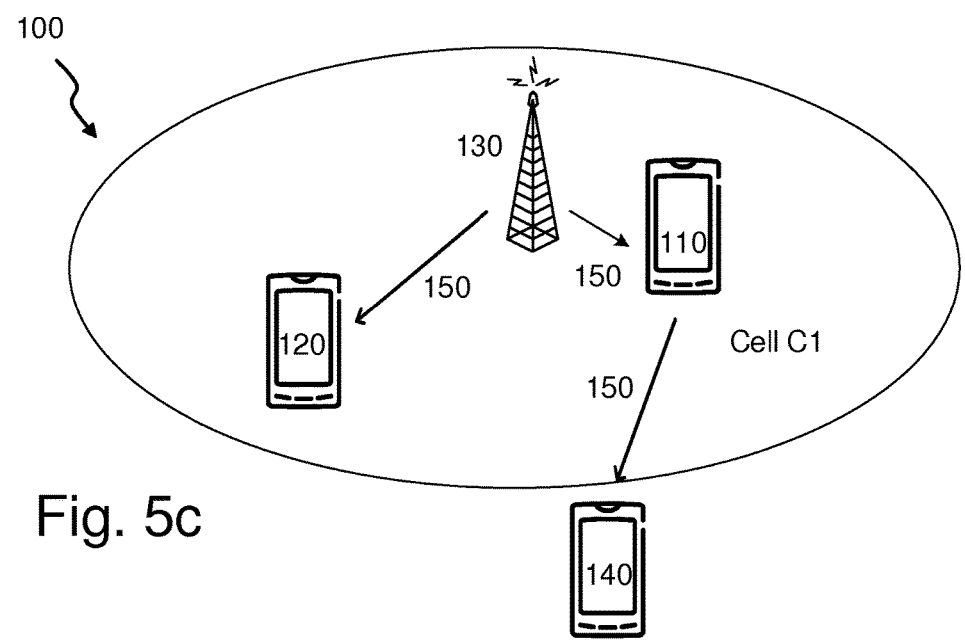

Moreover, a second wireless device 120 may be in range for D2D communication with the first wireless device 110. The second wireless device 120 may or may not be located inside the cell C1, as shown in FIGS. 5c and 5a respectively.

Furthermore, a third wireless device 140 may be in range for D2D communication with the first or second wireless device. The third wireless device 120 may or may not be located inside the cell C1.

In accordance with the proposed technique, the radio network node 130 or the first wireless device 110 may assign resources 150 for direct control signalling.

Figure 8:
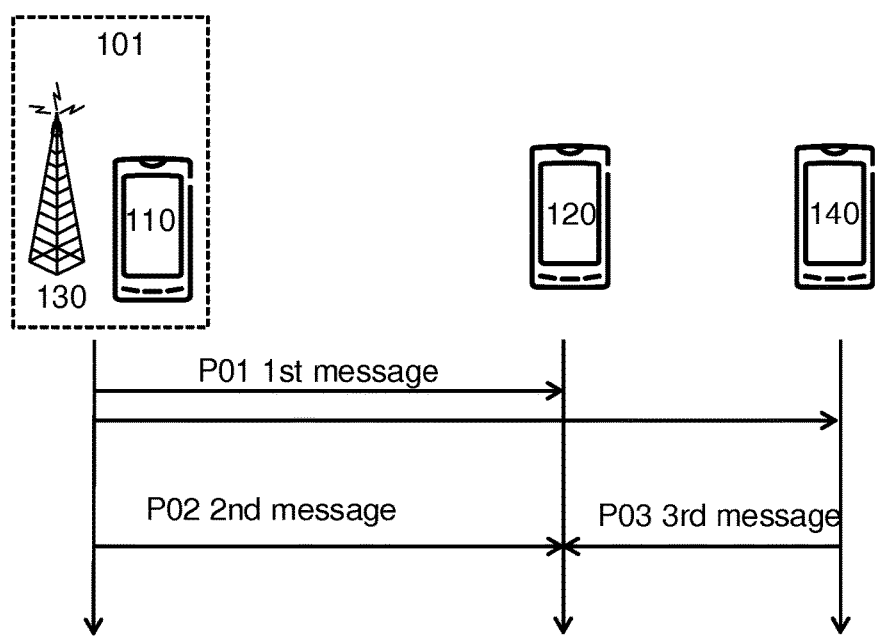
FIG. 8 illustrates the signalling exchanged between the radio node and wireless devices when performing the methods.

FIG. 8 illustrates exemplifying methods in the radio network node 130 or the wireless device 110 according to embodiments herein. The radio network node 130 and the wireless device 110 will be referred to as a radio node 101 in the following description when applicable.

The radio node 101 may perform a method for allocating resources for direct control signalling in a D2D communication. The radio node may be the radio network node 130 or a so called cluster head, which may be the wireless device 110 with certain authority to control one or more other wireless devices, such as the second and third wireless devices 120, 140 in a D2D communication. The devices controlled by a cluster head are referred to as a cluster. Such a scenario is illustrated in FIG. 5b, where the wireless devices are typically out of coverage of a cellular network, or where the cellular network is broken. The resources may be radio resources, resource blocks, sub frames, sub-channel or the like. An example of direct control signalling is the above mentioned DC message.

The following description in meant to generally describe the proposed technique. Hence, in-coverage as well as out-of-coverage is considered, which means that the principle is applicable in the different scenarios shown in FIGS. 5a to 5d. The following actions or signals visualised in FIG. 8 may be performed in any suitable order.

Action P01

The radio node 101 sends a first message P01 indicating resources for direct control signalling to the second and third wireless devices. The resources are typically resources to be used for direct control by wireless devices camping on or being controlled by the network node. Resources are typically defined by a time and frequency. Hence, wireless devices in the cell or cluster will use this window for direct control transmissions. The devices also need to monitor this window in order to discover other wireless devices in the cell or cluster.

The resources indicated are synchronized, in the time domain, with respect to a reception window, such as a subframe in LTE. In this manner, the radio node assigns resources for direct control signalling. The occurrence of the resources may be periodic, for example on a per radio frame basis, or sparse in time.

Figure 5D:
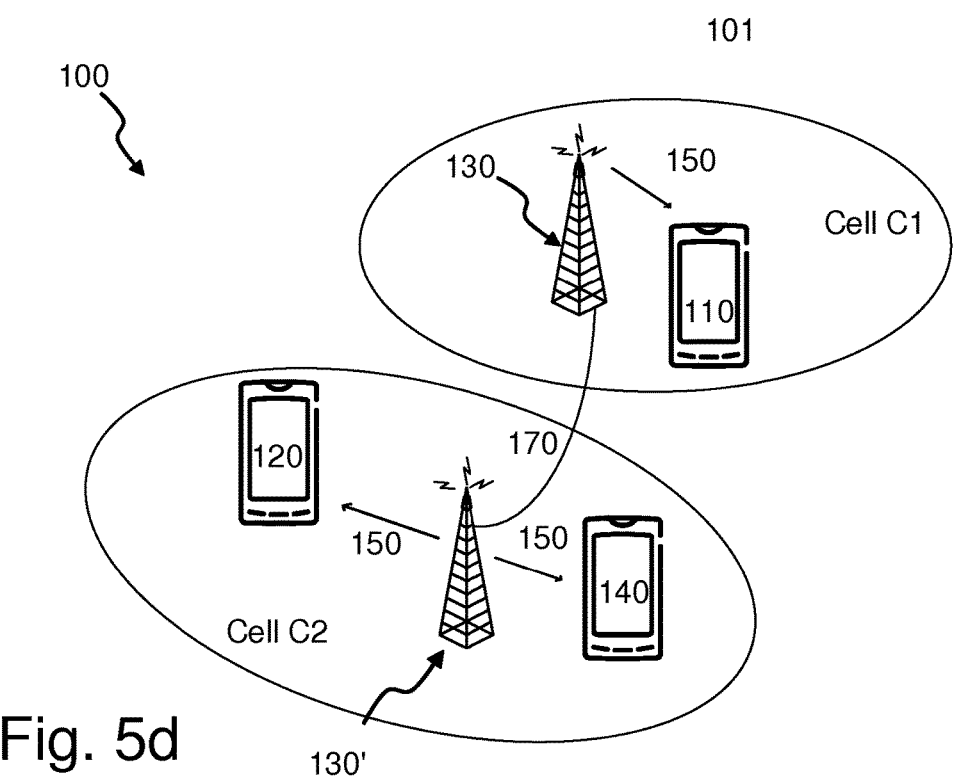

In some examples, the first wireless device 110 is camping on the cell C1 and the second and third wireless devices 120, 40 are camping on a further cell as illustrated in FIG. 5d.

The reception window may comprise one or more sub frames depending on the amount of direct control signalling, i.e. number of DC messages that is to be assigned to, or carried by, the resources provided in the reception window.

According to one aspect, see also FIG. 9, the first message indicates respective resources for direct control signalling in each of e.g. the cell and the further cell.

In this case, a wireless device is discovering or communicating with another wireless device belonging to a different cell on the same carrier and PLMN. The communication may be over the interface 170 between two eNodeBs, referred to as the X2 interface.

Note that the neighbour cells may or may not be synchronous at subframe level. Note also that inter-cell coordination of direct control resources is not a requirement. Hence, the network node signals resources for direct control signalling to be monitored, which corresponds to resources used for transmissions by wireless devices camping on neighbour cells.

The first message may also indicate identifiers for the cell and the further cell, such as physical cell identities.

Action P02

The second wireless device 120 receives, e.g. in the reception window, a second message, such as direct control signalling, a DC message or the like, from the first wireless device 110.

Action P03

Moreover, the second wireless device 120 receives, e.g. in the reception window, a third message, such as direct control signalling, a DC message or the like, from the third wireless device 140. The third wireless device has then received a similar message with information about the window to use for transmissions as illustrated in FIG. 8.

The second and third messages are thus received by the second wireless device 120 in the same reception window. However, the second and third messages are separated by TDMA, CDMA, FDMA or the like within the reception window.

According to the second embodiments, the second wireless device need not perform random access and RRC to obtain the respective resources in each of the cell and the further cell, since this information is provided in the first message.

The second wireless device may use the identifiers for the cell and the further cell to determine the respective DRX cycles in the cell and the further cell. Hence, also the number of FFTs required in the second wireless device 120 may be determined. The second wireless device may then choose to wake up at a subset of the resources indicated in the first message. For example, the second wireless device may wake up at every instance of the resources pertaining to the further cell, while the second wireless device may wake up only at some of the resource pertaining to the cell C1. Hence, since the second wireless device may in a selective and conscious manner, choose which resources for direction control signalling to monitor, the second wireless device may increase a sleep period of the DRX cycle without accidentally missing any direct control signalling.

It is in general assumed that the NW configures periodic (or sparse in time) resources for transmission of direct control messages (DC). Beacons used for discovery of devices in proximity are one example of DC messages. In case of lack of coverage, two cases are considered:

A UE with special control authority which is often referred to as a cluster head (CH), assigns DC resources to other UEs.

UEs decide autonomously on which resources to transmit DC, possibly within a subset of preconfigured resources (e.g., a certain sub band).

Devices located in the same cell (camping on the same cell) typically derive synchronization from the downlink in that cell. This ensures that transmissions from different devices are time synchronized and, consequently, reception at a given device is roughly synchronized (the timing difference is proportional to the distance and could be absorbed by the cyclic prefix in OFDM). A similar situation may happen in out of coverage, where UEs may synchronize to a CH UE.

The corresponding method performed in a radio node, 101, of assigning resources for direct control signalling will now be described in more detail referring to FIG. 6a. According to one aspect the assigned resources are radio resources, resource blocks, sub frames or sub-channels.

In the first step S1, the radio node 101 receives, from at least one further radio node, sets of resources for direct control signalling in a respective cell or cluster. As described above, the disclosure is based on a synchronisation between neighbour radio nodes.

In the second step S2, the radio node 101 assigns resources for direct control signalling transmission within an area controlled by the radio node based at least on the received sets of resources. According to one aspect the assigning, S2, comprises to assign resources for D2D discovery signalling. Different strategies for doing this may be used depending on the situation. However, a probable scenario is that the received, S1, set of resources are utilised in order to optimise e.g. sleep cycles in a DTX mode.

Figure 6A:
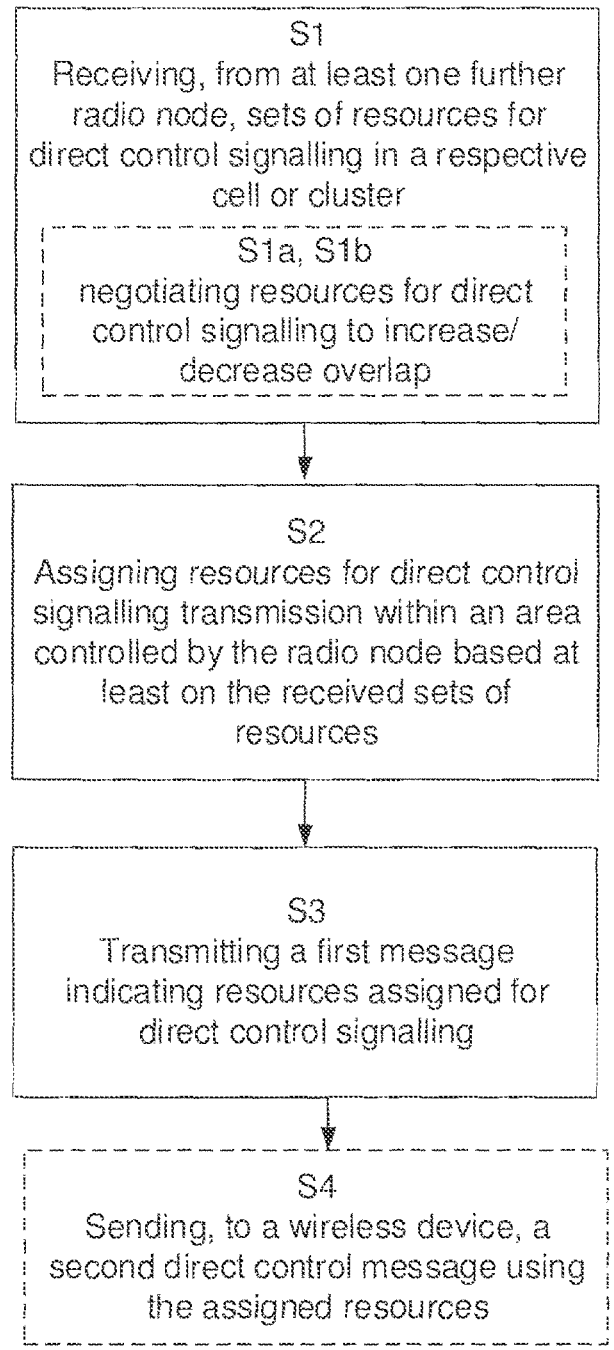
FIGS. 6a-6b illustrate exemplifying methods in the radio node in a flowchart.
Figure 6B:
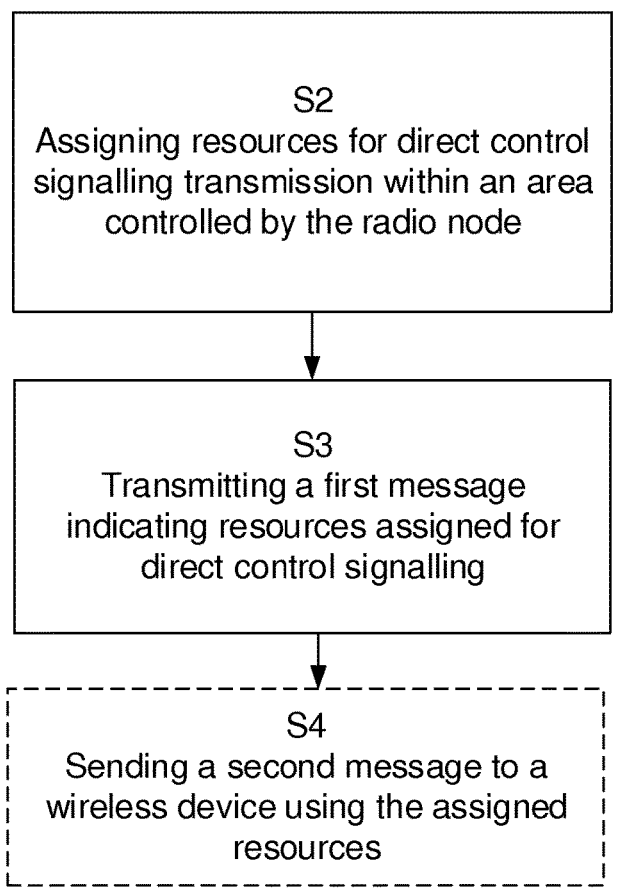

In an alternative embodiment, shown in FIG. 6b, step S1 is omitted. Then the assignment S2 of resources is based on e.g. measurements or other assumptions. In principle the resources may be pre-programmed in the radio node, wherein the same time and frequencies are always used.

In the third step S3, the radio node 101 transmits, to wireless devices controlled by the radio node, a message P01 indicating resources assigned for direct control signalling. For example the radio node indicates a window to be used for direct control transmission by wireless devices camping on the cell, see FIG. 9. This transmission may be a broadcast transmission to all wireless devices in the cell or cluster. Alternatively, the message is directed to one or several specific wireless devices or User Equipments, UEs. Then different UEs may be assigned different resources as shown in FIG. 9, where three UEs A, B and C are allocated different resources in time.

Figure 10:
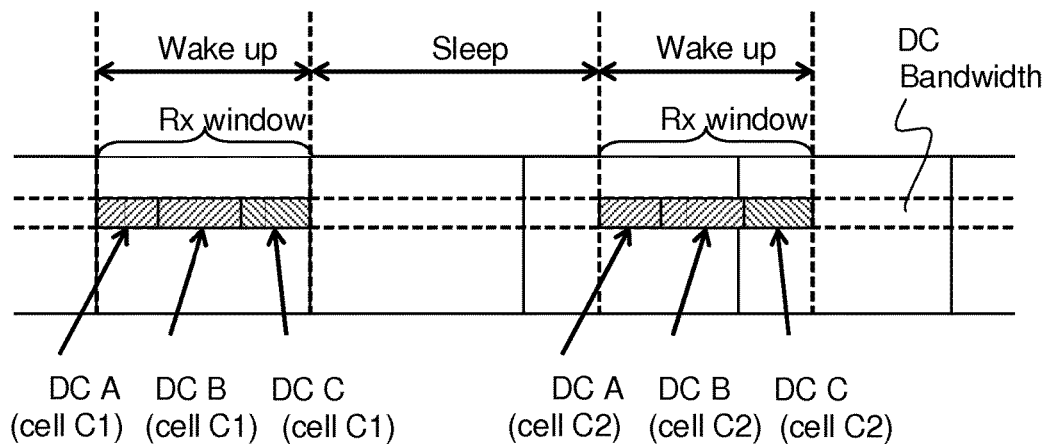
FIG. 10 illustrates an example where the receiver maximizes the DRX duty cycle without the risk of missing DC messages.

According to one aspect the message indicates respective resources assigned for direct control signalling in each of a cell, C1, or cluster defined by the radio node 101, and at least a further cell, C2, or cluster. Hence, as described specified for cell and further cell as illustrated in FIGS. 9 and 10, showing a first tx window used by wireless devices in cell C1 and a second tx window used by wireless devices in cell C2. As described above, a wireless device may communicate with devices both inside and outside the cell or cluster. Hence, in cell C1, indication of resources assigned for direct control signalling in neighbour cells, C2, or clusters may be relevant as well. Hence, a wireless device camping on cell C1 typically uses one transmission window 91 for direct control transmissions such as beacons, but may want to watch both transmission windows 91, 92 in for discovery purposes.

In the following, the embodiments above are described in more detail. Multiple aspects are possible and they can be used either alone or in combinations. In a first embodiment (the network or the CH assigns DC resources in order to increase, such as maximize, reuse of each subframe and employ as few sub frames as possible for DC.

FIG. 9 illustrates an example of synchronized multiplexing of DC messages within each cell (or CH). The number of required reception windows and parallel FFT processes is smaller, compared to an unsynchronized scenario with the same number of DC messages.

Within each subframe, DC messages may be multiplexed, e.g., by TDMA, FDMA or CDMA. This solution has several advantages, such as:
  Multiple DC messages are received within the same reception window, reducing the need for multiple reception windows and correspondingly improving energy consumption and interference;
  When attempting reception of DC messages transmitted from UEs camping on another cell, the probability of receiving multiple DC messages within the same reception window is increased. This reduces receiver implementation complexity because typically a single FFT process is needed for each reception window;
  Assuming that UEs belonging to the same cell have relatively similar path loss towards a given UE, it is easier for the receiver to set AGC for each subframe and safely decode the DC messages multiplexed within the subframe.

According to the second embodiment, which is shown in FIG. 10, the network informs a device about the timing and/or frequency relation of the DC resources of the neighbouring cells and the reference timing and frequency for the cell it is camping on.

FIG. 10 illustrates an example of synchronized multiplexing of DC messages within each cell (or CH). Signalling of the time (and/or frequency) offset associated to DC signalling in neighbour cells and/or CHs allows the receiver to maximize the DRX duty cycle without the risk of missing DC messages.

One possibility is to provide this information in the form of a list of physical cell identities and corresponding time and/or frequency differences relative to the cell the device is camping on. The device can then use this information to determine the DRX cycles and the number of FFTs required. In a further example, when a UE enters a new tracking area, it is provided with DC resources for each cell of the tracking area. This is to avoid that the UE performs random access and an RRC reconfiguration in order to acquire the DC resources whenever changing cell within the tracking area.

In order to achieve the above embodiment, different eNBs in the network need to signal the sets of resources for DC in each cell. As described above the network node receives this signalling in step S1. Possibly, the eNBs may negotiate such resources in order to increase the overlap in time and/or frequency of DC resources in different cells. Hence, according to one aspect the step S1 of receiving, S1, comprises negotiating, S1a, with at least one other radio node, resources for direct control signalling, thereby increasing an overlap in time and/or frequency of resources for direct control signalling in different cells or clusters. According to one aspect the message comprises at least one identifier for a cell, C1, or cluster defined by the radio node, 101

A trade-off between power consumption and the possibilities to detect devices in neighbouring cells could also be achieved by adjusting the number of cells (or cell clusters) the device takes into account when setting the DRX cycles; increasing the number of cells (with a different timing than the serving cell) that the device monitors for other devices control signalling implies more frequent wake up from DRX and increases the power consumption. A possibility is to configure UEs to systematically wake up for reception of DC in the own cell and wake up only on a subset of the DC resources associated to neighbour cells. This solution would result in larger discovery latency for neighbour cell UEs.

According to an alternative aspect the step of receiving, S1, comprises negotiating, S1b, with at least one other radio node, resources for direct control signalling, thereby decreasing an overlap in time and/or frequency of resources for direct control signalling in different cells or clusters.

According to one aspect the radio node, 101, is a wireless device, 110, with certain authority to control one or more other wireless devices, 120, 140, in D2D communication. Then the method further comprises the step of sending, S4, to a wireless device, a second direct control message using the assigned resources. This refers to the case when the radio node is a "cluster head". The wireless device 101 may then first assign direct control resources and then utilise the resources.

According to one aspect the step of assigning, S2, comprises assigning resources that occur periodically on a per radio frame basis, as explained above.

According to one aspect the disclosure relates to a computer program comprising computer program code which, when executed in a radio node, 101, causes the radio node, 101, to execute the method.

The corresponding method performed in a wireless device, of obtaining resources for direct control signalling in D2D communication will now be described in more detail referring to FIG. 7.

In a first step the wireless device receives, 511, from a radio node 101, a message POI indicating resources assigned for direct control signalling, to wireless devices controlled by the radio node, 101. Hence, this step corresponds to step 53 in FIGS. 6a-6b or message POI in FIG. 8.

In a second step the wireless device utilises, S13, the indicated resources for direct control signalling. The indicated resources are e.g. resources to be used for direct control transmissions in a certain cell or cluster.

According to one aspect, the message indicates respective resources for direct control signalling in each of a cell, C1, or cluster defined by the radio node, 101, and a further cell, C2, or cluster defined by a further radio node, 160. Referring again to FIG. 5d we know that direct control between wireless devices camping on different cells is a possible scenario. Hence, the radio nodes then needs to signal, not only its own direct control resources, but also direct control resources or neighbour cells, as the wireless devices may want to watch these resources as well.

According to one aspect, the step of utilising, S13, further comprises receiving, P02, a second message, using the indicated resources. Hence, because the wireless device knows which resources to listen to, it may receive data using the indicated resources According to one aspect, the step of utilising, S13, further comprises transmitting, P03, a third message, using the resources provided in the received message.

According to one aspect, the second and third messages are separated by Time Division Multiple Access, TDMA, Code Division Multiple Access, CDMA, or Frequency Division Multiple Access, FDMA as explained above in relation to FIG. 4.

According to one aspect, the method further comprises selecting, S12, at least one indicated resource for monitoring.

According to one aspect, the method further comprises determining, S14, discontinuous reception, DRX, cycles of the wireless device, 120, 130, using information comprised in the received message.

In a further embodiment, the UE adopts different DRX duty cycles depending on whether the UE is under NW coverage or out of NW coverage. Possibly, a further DRX duty cycle might be selected if the UE is out of NW coverage but associated to a CH. In one example, an idle UE is wake up for D2D DC reception only at the time (and frequency) resources signalled by the network (such resources might include DC resources for multiple cells). However, when the idle UE loses NW coverage, it becomes always awake and tracks all the preconfigured resources for DC, at least until it successfully establishes connection with a CH. After connection with a CH, a new DRX cycle may be possibly signalled by the CH.DRX for D2D and DC reception purposes may be combined with DRX cycles for cellular communication purposes. E.g., a condition can be defined such that the UE is awake whenever either of the cellular or D2D DRX cycles indicate the wake up state.

According to one aspect, the disclosure further relates to a computer program comprising computer program code which, when executed in a Device to Device, D2D, device, 120, 140, causes the wireless device, 120, to execute the methods in a wireless device.

Figure 11:
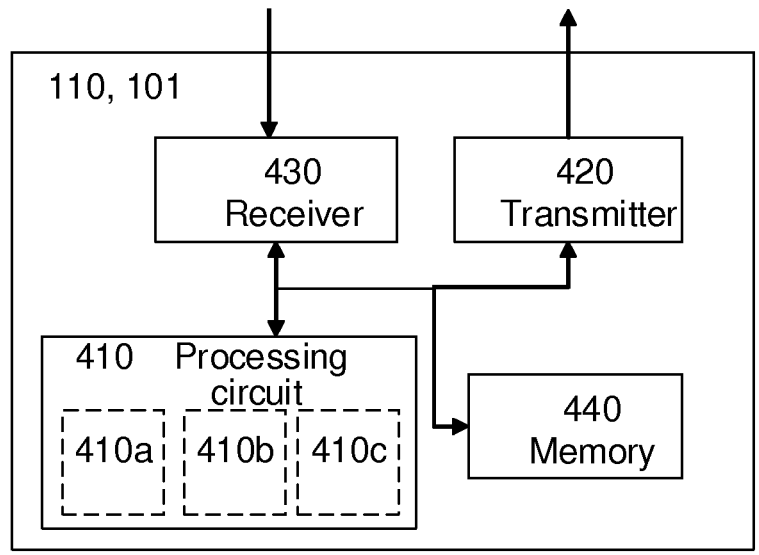
FIG. 11 is a schematic block diagram of a radio node.

With reference to FIG. 11, a schematic block diagram of the first wireless device 110 is shown. The first wireless device 110 is configured to perform the methods in FIGS. 6a-6b and 8. The first wireless device 110 is configured to manage resources to be allocated to broadcast data. More generally, the description in connection to FIG. 11 equally applies to the radio node 101.

The first wireless device 110 comprises processing circuitry 410 configured to perform the method in FIGS. 6a-6b and 8. More specifically the processing circuit 410 is configured to cause radio node 101:
to receive, using the receiver, from at least one further radio node 160, sets of resources for direct control signalling in a respective cell or cluster,
to assign, resources for direct control signalling based on the received sets of resources, and
to transmit, using the transmitter, to wireless devices controlled by 15 the radio node, a message indicating resources assigned for direct control signalling. The method according to any of the preceding claims, wherein the radio node 101 is a radio network node The processing circuitry 410 may comprise a determining unit, a calculation unit, a selection unit and the like as required for performing the embodiments herein. In particular the processing circuitry 410 may comprise a receiver module 410a configured to receive, using the receiver, from at least one further radio node 160, sets of resources for direct control signalling in a respective cell or cluster. It may further comprise an assigner 410b configured to assign, resources for direct control signalling based on the received sets of resources, and a transmitter module 410b configured to transmit, using the transmitter, to wireless devices controlled by the radio node, a message indicating resources assigned for direct control signalling. The method according to any of the preceding claims, wherein the radio node 101 is a radio network node 130.

The processing circuit 410 may be a processing unit, a processor, an application specific integrated circuit (ASIC), a field-programmable gate array (FPGA) or the like. As an example, a processor, an ASIC, an FPGA or the like may comprise one or more processor kernels.

The first wireless device 110 further comprises a transmitter 420, which may be configured to send one or more numbers, values or parameters described herein.

The first wireless device 110 further comprises a receiver 430, which may be configured to receive one or more numbers, values or parameters described herein.

The first wireless device 110 further comprises a memory 440 for storing software to be executed by, for example, the processing circuit. The software may comprise instructions to enable the processing circuit to perform the method in the wireless device 110 as described above in conjunction with FIG. 8. The memory may be a hard disk, a magnetic storage medium, a portable computer diskette or disc, flash memory, random access memory (RAM) or the like. Furthermore, the memory may be an internal register memory of a processor.

Figure 12:
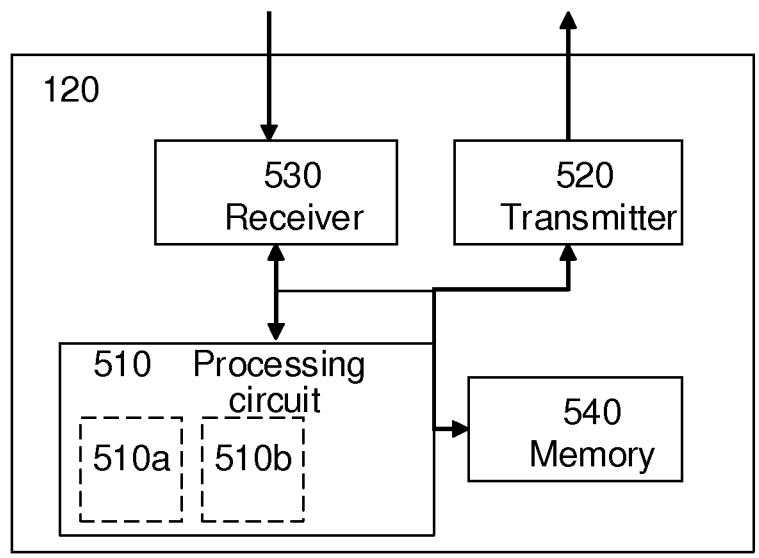
FIG. 12 is a schematic block diagram of a wireless device.

Completely analogous to the description above with reference to FIG. 11, a second wireless device is provided. The second wireless device is configured to perform the action above in conjunction with Figure Hence, with reference to FIG. 12, a schematic block diagram of the second wireless device 120 is shown. The second wireless device 120 is configured to obtaining resources for direct control signalling.

Figure 7:
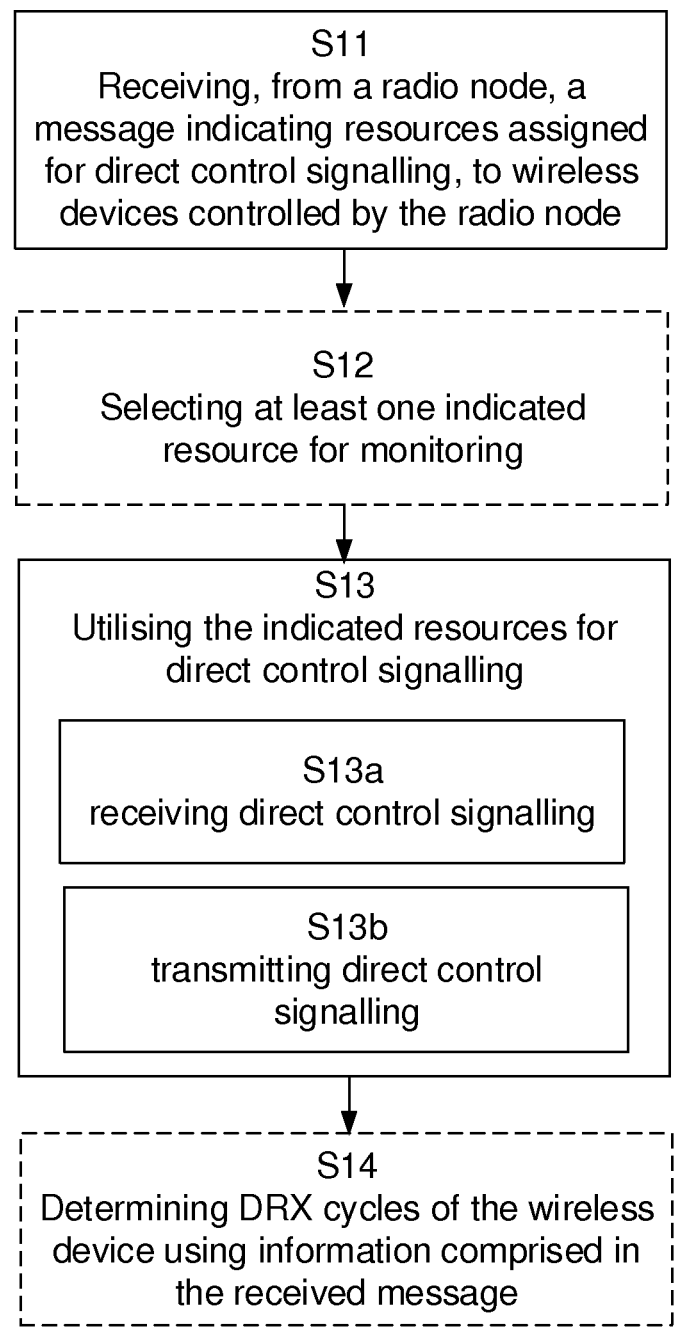
FIG. 7 illustrates exemplifying methods in a wireless device in a flowchart.

The second wireless device 120 is configured to perform the methods in FIGS. 7 and 8. The second wireless device 120 is configured to receive the first message in order to be informed about resources for direct control signalling.

The second wireless device 130 comprises a processing circuit 510 configured to perform the method in FIG. 8. In particular the second wireless device is configured:
to receive, using the receiver, from a radio node 101, a message indicating resources assigned for direct control signalling to wireless devices controlled by the radio node 101, and
to utilise, using the receiver 530 and/or the transmitter 520, the indicated resources for direct control signalling.

The processing circuit 410 may comprise a determining unit, a calculation unit, a selection unit and the like as required for performing the embodiments herein. In particular the processing circuitry 510 may comprise a receiver module 510a configured to receive, using the receiver, from a radio node 101, a message indicating resources assigned for direct control signalling to wireless devices controlled by the radio node 101, and a utilizer 510b configured to utilise, using the receiver 530 and/or the transmitter 520, the indicated resources for direct control signalling.

The processing circuit 510 may be a processing unit, a processor, an application specific integrated circuit (ASIC), a field-programmable gate array (FPGA) or the like. As an example, a processor, an ASIC, an FPGA or the like may comprise one or more processor kernels.

The second wireless device 120 further comprises a transmitter 520, which may be configured to send one or more numbers, values or parameters described herein.

The second wireless device 120 further comprises a receiver 530, which may be configured to receive one or more numbers, values or parameters described herein.

The second wireless device 120 further comprises a memory 540 for storing software to be executed by, for example, the processing circuit. The software may comprise instructions to enable the processing circuit to perform the method in the second wireless device 120 as described above in conjunction with FIG. 8. The memory may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed in a radio node, of assigning resources for device-to-device discovery signalling, the method comprising:
   receiving, from a further radio node, information indicating resources for device-to-device discovery signalling in a cell or cluster defined by the further ratio node;
   assigning resources for device-to-device discovery signalling transmission within an area controlled by the radio node based at least on the indicated resources; and
   transmitting, to wireless devices controlled by the radio node, a message indicating the resources assigned for device-to-device discovery signalling in the cell or cluster defined by the radio node, and
   the resources assigned for device-to-device discovery signalling in the cell or cluster defined by the further radio node; and
   wherein any of said device-to-device discovery signalling comprises one or more beacons, each beacon indicating an identity of a Device-to-Device (D2D) device to be discovered by another D2D device.

2. The method according to claim 1, wherein the step of receiving, comprises negotiating, with at least the further radio node, resources for device-to-device discovery signalling, thereby increasing an overlap in time and/or frequency of resources for device-to-device discovery signalling in different cells or clusters.

3. The method according to claim 1, wherein the step of receiving, comprises negotiating, with at least the further radio node, resources for device-to-device discovery signalling, thereby decreasing an overlap in time and/or frequency of resources for device-to-device discovery signalling in different cells or clusters.

4. The method according to claim 1, wherein the message comprises at least one identifier for a cell or cluster defined by the radio node.

5. The method according to claim 1, wherein the resources are radio resources, resource blocks, sub frames or sub-channels.

6. The method according to claim 1, wherein the radio node is a wireless device with authority to control one or more other wireless devices in D2D communication and wherein the method further comprises: sending, to a wireless device, a second device-to-device discovery message using the assigned resources.

7. The method according to claim 1, wherein the step of assigning comprises assigning resources that occur periodically on a per radio frame basis.

8. A computer program product stored on a non-transitory, computer readable medium and comprising computer program code which, when executed by at least one processor in a radio node, causes the radio node to:
   receive, from a further radio node, information indicating resources for device-to-device discovery signalling in a cell or cluster defined by the further radio node;
   assign resources for device-to-device discovery signalling transmission within an area controlled by the radio node based at least on the indicated resources; and
   transmit, to wireless devices controlled by the radio node, a message indicating the resources assigned for device-to-device discovery signalling in a cell or cluster defined by the radio node, and
   the resources assigned for device-to-device discovery signalling in the cell or cluster defined by the further radio node; and
   wherein any of said device-to-device discovery signalling comprises one or more beacons, each beacon indicating an identity of a Device-to-Device (D2D) device to be discovered by another D2D device.

9. A method, performed in a Device-to-Device (D2D) device, of obtaining resources for device-to-device discovery signalling, the method comprising:
   receiving, from a radio node controlling the D2D device, a message indicating resources assigned for device-to-device discovery signalling to wireless devices controlled by the radio node, wherein the message indicates resources for device-to-device discovery signalling in a cell or cluster defined by the radio node, and
   resources received from a further radio network node indicating resources for device-to-device discovery signalling in a cell or cluster defined by the further radio node; and
   utilising the indicated resources for device-to-device discovery signalling; and
   wherein any of said device-to-device discovery signalling comprises one or more beacons, each beacon indicating an identity of a D2D device to be discovered by another D2D device.

10. The method according to claim 9, wherein the step of utilising further comprises receiving a second message, using the indicated resources.

11. The method according to claim 10, wherein the step of utilising further comprises transmitting a third message, using the resources provided in the received message.

12. The method according to claim 11, wherein the second and third messages are separated by Time Division Multiple Access (TDMA), Code Division Multiple Access (CDMA), or Frequency Division Multiple Access (FDMA).

13. The method according to claim 9, further comprising: selecting at least one indicated resource for monitoring.

14. The method according to claim 9, further comprising: determining discontinuous reception (DRX) cycles of the D2D device using information comprised in the received message.

15. A computer program product stored on a non-transitory, computer readable medium and comprising computer program code which, when executed in a processor of a Device-to-Device (D2D) device causes the D2D device to:
receive, from a radio node controlling the D2D device, a message indicating resources assigned for device-to-device discovery signalling to wireless devices controlled by the radio node, wherein the message indicates resources for device-to-device discovery signalling in a cell or cluster defined by the radio node, and
resources received from a further radio network node indicating resources for device-to-device discovery signalling in a cell or cluster defined by the further radio node; and
utilise the indicated resources for device-to-device discovery signalling; and
wherein any of said device-to-device discovery signalling comprises one or more beacons, each beacon indicating an identity of a D2D device to be discovered by another D2D device.

16. A radio node, configured to assign resources for device-to-device discovery signalling, the radio node comprising:
a transmitter; a receiver; and processing circuit configured to cause the radio node:
to receive, using the receiver, from a further radio node, information indicating resources for device-to-device discovery signalling in a cell or cluster defined by the further radio node;
to assign resources for device-to-device discovery signalling based on the indicated resources; and to transmit, using the transmitter, to wireless devices controlled by the radio node, a message indicating the resources assigned for device-to-device discovery signalling in a cell or cluster defined by the radio node, and
the resources assigned for device-to-device discovery signalling in the cell or cluster defined by the further radio node; and
wherein any of said device-to-device discovery signalling comprises one or more beacons, each beacon indicating an identity of a Device-to-Device (D2D) device to be discovered by another D2D device.

17. The radio node according to claim 16, wherein the radio node is a radio network node.

18. The radio node according to claim 16, wherein the radio node is a wireless device with authority to control one or more other wireless devices in device-to-device discovery communication.

19. A wireless device configured to obtain resources for device-to-device discovery signalling, the wireless device comprising: a transmitter; a receiver; and processing circuitry configured to cause the wireless device:
to receive, using the receiver, from a radio node controlling the wireless device, a message indicating resources assigned for device-to-device discovery signalling to wireless devices controlled by the radio node, wherein the message indicates resources for device-to-device discovery signalling in a cell or cluster defined by the radio node, and resources received from a further radio network node indicating resources for device-to-device discovery signalling in a further cell or cluster defined by the further radio node; and
to utilise, using the receiver and/or the transmitter, the indicated resources for device-to-device discovery signalling; and
wherein any of said device-to-device discovery signalling comprises one or more beacons, each beacon indicating an identity of a Device-to-Device (D2D) device to be discovered by another D2D device.

20. The method of claim 9, wherein utilising the indicated resources comprises transmitting a beacon to a plurality of D2D devices indicating that the D2D device wishes to be discovered by another D2D device.

21. The method of claim 1, wherein assigning resources comprises synchronizing reception windows for the cell or cluster defined by the radio node with reception windows in at least the cell or cluster defined by the further radio node, and wherein the reception windows are for receiving one or more beacons.

22. The method of claim 1, wherein the receiving comprises receiving the information indicating resources for device-to-device discovery signaling in the cell defined by the radio node, and wherein the transmitting comprises transmitting the message to all wireless devices within the cell defined by the radio node, the message indicating the resources assigned for device-to-device discovery signalling in the cell defined by the radio node and a the cell defined by the further by radio node.

23. The method of claim 1, wherein the transmitting comprises broadcasting the message to the wireless devices, the message indicating the same resources for each of the wireless devices to use when transmitting device-to-device discovery signalling comprising a beacon, the beacon indicating an identity of the transmitting wireless device to be discovered by another D2D device.

24. The method of claim 1, wherein the assigning resources comprises assigning resources to reduce the amount of reception windows needed for the one or more beacons in the cell or cluster defined by the radio node.

25. The method of claim 9, wherein the utilizing comprises utilizing the indicated resources to receive one or more beacons in synchronized reception windows in the cell or cluster defined by the radio node and the cell or cluster defined by the radio node.

26. The method of claim 9, wherein the method further comprises, based on the device-to-device discovery signalling, setting up and engaging in D2D communication between the D2D device and a wireless device of the wireless devices controlled by the radio node.

27. The method of claim 9, wherein the method further comprises, based on the device-to-device discovery signalling, setting up and engaging in D2D communication between the D2D device and a wireless device controlled by the further radio node.

* * * * *

UNITED STATES PATENT AND TRADEMARK OFFICE
CERTIFICATE OF CORRECTION

Page 1 of 2

PATENT NO. : 9,974,051 B2
APPLICATION NO. : 14/364020
DATED : May 15, 2018
INVENTOR(S) : Sorrentino et al.

It is certified that error appears in the above-identified patent and that said Letters Patent is hereby corrected as shown below:

In Column 1, Line 28, delete "spectrum" and insert -- spectrum. --, therefor.

In Column 2, Line 45, delete "-precoded" and insert -- precoded --, therefor.

In Column 4, Line 60, delete "communication" and insert -- communication. --, therefor.

In Column 5, Line 5, delete "FIG. 5a-5d" and insert -- FIGS. 5a-5d --, therefor.

In Column 6, Line 41, delete "third wireless device 120" and insert -- third wireless device 140 --, therefor.

In Column 7, Lines 23-24, delete "wireless devices 120, 40" and insert -- wireless devices 120, 140 --, therefor.

In Column 9, Line 7, delete "radio node 101," and insert -- radio node, 101, --, therefor.

In Column 9, Line 24, delete "(the" and insert -- the --, therefor.

In Column 9, Line 44, delete "window;" and insert -- window. --, therefor.

In Column 10, Line 15, delete "radio node, 101" and insert -- radio node 101. --, therefor.

In Column 10, Line 39, delete "wireless device 101" and insert -- wireless device 110 --, therefor.

In Column 10, Line 53, delete "511," and insert -- S11, --, therefor.

In Column 10, Line 54, delete "POI" and insert -- P01 --, therefor.

In Column 10, Line 56, delete "radio node, 101." and insert -- radio node 101. --, therefor.

Signed and Sealed this
Twenty-fifth Day of September, 2018

Andrei Iancu
*Director of the United States Patent and Trademark Office*

CERTIFICATE OF CORRECTION (continued)
U.S. Pat. No. 9,974,051 B2

In Column 10, Line 57, delete "step 53" and insert -- step S3 --, therefor.

In Column 10, Line 57, delete "POI" and insert -- P01 --, therefor.

In Column 11, Line 9, delete "resources" and insert -- resources. --, therefor.

In Column 11, Line 23, delete "wireless device, 120, 130," and insert -- wireless device, 120, 140, --, therefor.

In Column 11, Line 67, delete "radio network node" and insert -- radio network node 130. --, therefor.

In Column 12, Line 48, delete "second wireless device 130" and insert -- second wireless device 120 --, therefor.

In Column 13, Line 34, in Claim 1, delete "ratio node;" and insert -- radio node; --, therefor.

In Column 16, Line 30, in Claim 22, delete "a the cell" and insert -- the cell --, therefor.

In Column 16, Line 31, in Claim 22, delete "further by" and insert -- further --, therefor.

In Column 16, Line 47, in Claim 25, delete "the radio" and insert -- the further radio --, therefor.